UNITED STATES PATENT OFFICE.

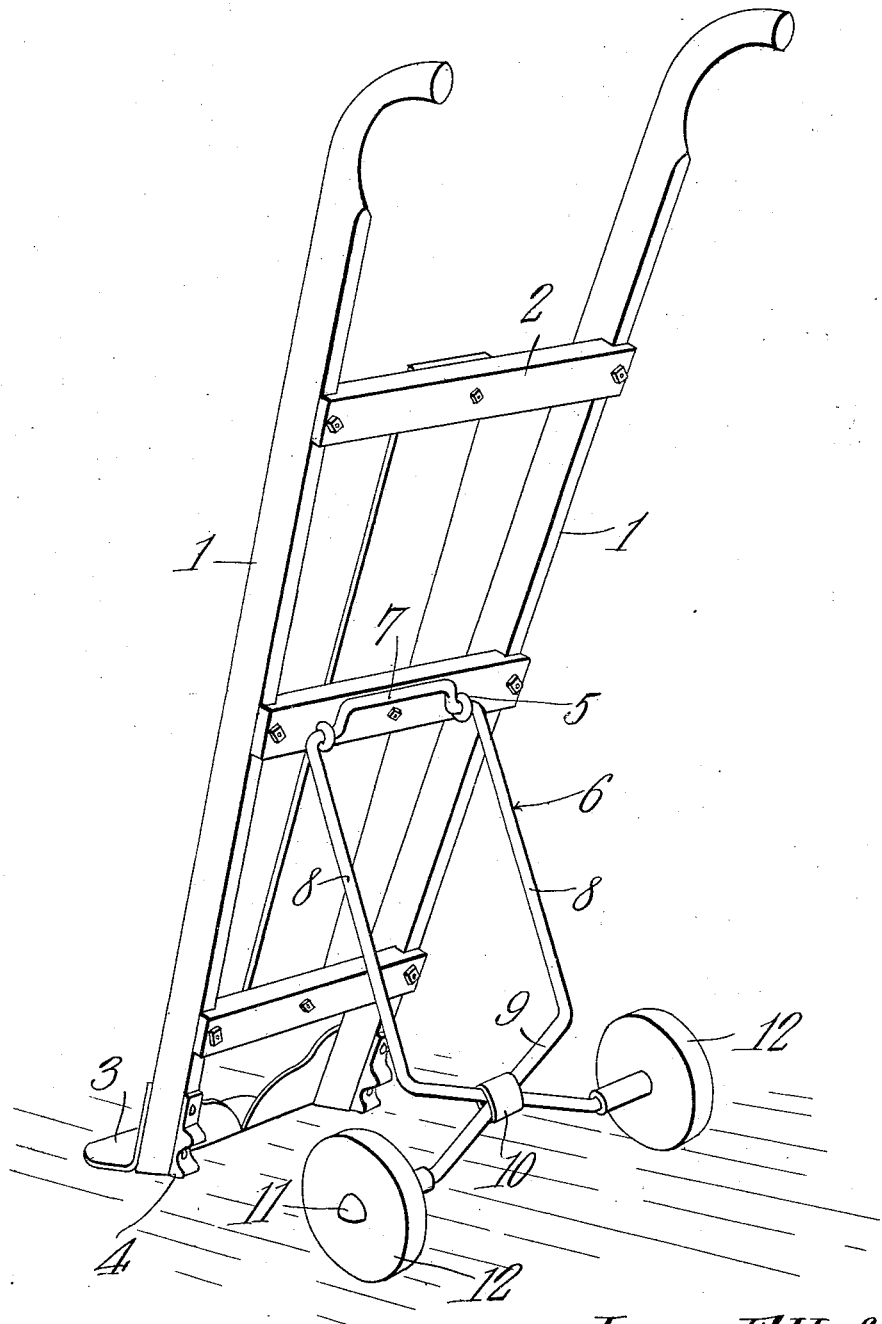

JAMES F. HAFFEY, OF TIFFIN, OHIO.

TRUCK.

No. 863,275.  Specification of Letters Patent.  Patented Aug. 13, 1907.

Application filed May 11, 1907. Serial No. 373,088.

*To all whom it may concern:*

Be it known that I, JAMES F. HAFFEY, a citizen of the United States, residing at Tiffin, in the county of Seneca and State of Ohio, have invented a new and useful Truck, of which the following is a specification.

This invention has relation to trucks and it consists in the novel construction and arrangement of its parts as hereinafter shown and described.

The object of the invention is to provide a truck with a swinging frame upon which the supporting wheels is journaled and which may be moved to such an angle with relation to the body of the truck as to support it upon its end.

In the accompanying drawing:—the figure is a perspective view of the truck.

The truck consists of the side bars 1 which terminate at their upper ends in handles and which are held together by cross pieces 2. The lower ends of the said handles are provided with the usual lip 3. The bearings 4 are located under the lower end of the bars 1. The intermediate cross piece 2 is provided upon its under side with the eyes 5 and a frame 6 is pivoted in the said eyes and is formed from a continuous rod which passes through the said eyes and is provided with an intermediate portion 7 bent out of alinement with those portions extending through the eyes 5. The said intermediate portion 7 is adapted to bear laterally against the under side of the said cross piece 2 and thus limit the swinging movement of the frame. From the eyes 5 the rod from which the frame 6 is formed is provided with the parallel sections 8 which merge into the cross sections 9. Said cross sections 9 are held together at the point of intersection by the band 10 and have their ends extended into spindles 11 upon which the wheels 12 are journaled. The inner portions of the spindles 11 are adapted to rest in the bearings 4 when the truck is used for transporting bags or other material.

Having described my invention what I claim as new and desire to secure by Letters-Patent is:—

1. A sacking truck, means for holding the sack attached thereto, a supporting frame comprising a rod pivoted to the truck and having an intermediate portion adapted to engage the truck to limit the swing of the frame, said frame also having side portions and cross sections which terminate in spindles, wheels journaled upon said spindles and a band securing the cross sections together at the point of intersection.

2. A sacking truck, a supporting frame for the same, comprising a rod pivoted to the truck at an intermediate point, said rod having cross sections which terminate in spindles, wheels journaled on the spindles and a band securing the cross sections together at the point of intersection.

In testimony that I claim the foregoing as my own, I have hereto affixed my signature in the presence of two witnesses.

JAMES F. HAFFEY.

Witnesses:
 HAM P. BLACK,
 E. G. STALEY.